US011689521B2

(12) United States Patent
Fletcher et al.

(10) Patent No.: US 11,689,521 B2
(45) Date of Patent: Jun. 27, 2023

(54) NATIVE SINGLE SIGN-ON (SSO) FOR MOBILE APPLICATIONS

(71) Applicant: Verizon Patent and Licensing Inc., Basking Ridge, NJ (US)

(72) Inventors: George Fletcher, Round Hill, VA (US); Francis Hsu, Santa Clara, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 515 days.

(21) Appl. No.: 16/123,060

(22) Filed: Sep. 6, 2018

(65) Prior Publication Data

US 2019/0394187 A1 Dec. 26, 2019

Related U.S. Application Data

(60) Provisional application No. 62/689,031, filed on Jun. 22, 2018.

(51) Int. Cl.
*H04L 9/00* (2022.01)
*H04L 9/40* (2022.01)
*H04W 8/18* (2009.01)
*H04W 12/06* (2021.01)

(52) U.S. Cl.
CPC ...... *H04L 63/0815* (2013.01); *H04L 63/0807* (2013.01); *H04L 63/0853* (2013.01); *H04L 63/102* (2013.01); *H04W 8/18* (2013.01); *H04W 12/06* (2013.01)

(58) Field of Classification Search
CPC ............. H04L 63/0815; H04L 63/0807; H04L 63/0853; H04L 63/102
See application file for complete search history.

(56) References Cited

U.S. PATENT DOCUMENTS

| 9,473,485 B2* | 10/2016 | Kendall ................. G06F 21/53 |
| 2014/0075513 A1* | 3/2014 | Trammel ............ H04L 63/0876 726/4 |
| 2014/0082715 A1* | 3/2014 | Grajek ................ H04L 63/0815 726/8 |
| 2015/0089569 A1* | 3/2015 | Sondhi ................ H04L 63/0807 726/1 |
| 2017/0116424 A1* | 4/2017 | Aamir ................... H04L 9/0825 |
| 2019/0007421 A1* | 1/2019 | D ......................... H04L 63/0807 |

FOREIGN PATENT DOCUMENTS

| WO | WO2008232111 A1 * | 6/2018 | ............... G06F 7/04 |
| WO | 2019/036012 | 2/2019 | |

OTHER PUBLICATIONS

Extended European Search Report to corresponding EP application No. 19166329.3 dated Aug. 5, 2019 (8 pages).

* cited by examiner

*Primary Examiner* — Christopher J Brown

(57) ABSTRACT

Systems and methods for enhanced SSO, which can avoid faults in known protocols and standards for access delegation. For example, the enhanced SSO can use a shared security mechanism, such as a keychain or keystore, for sharing vendor identity over mobile applications without some of the pitfalls of using cookies. And, a connector code can bind the mobile applications to each other so that only the enhanced SSO is required for a user to log in to the mobile applications and remain logged in to the applications on one or more mobile devices.

18 Claims, 6 Drawing Sheets

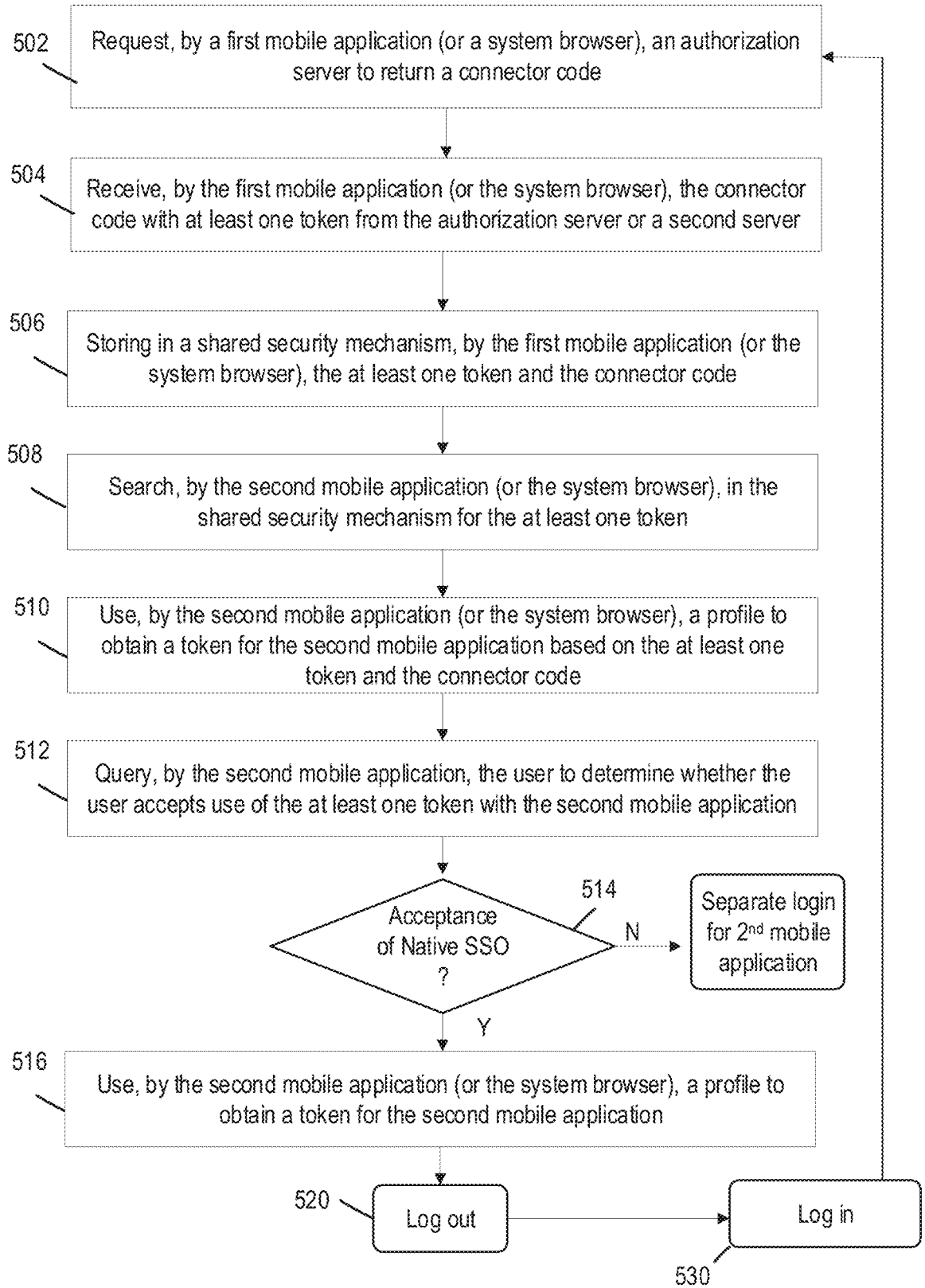

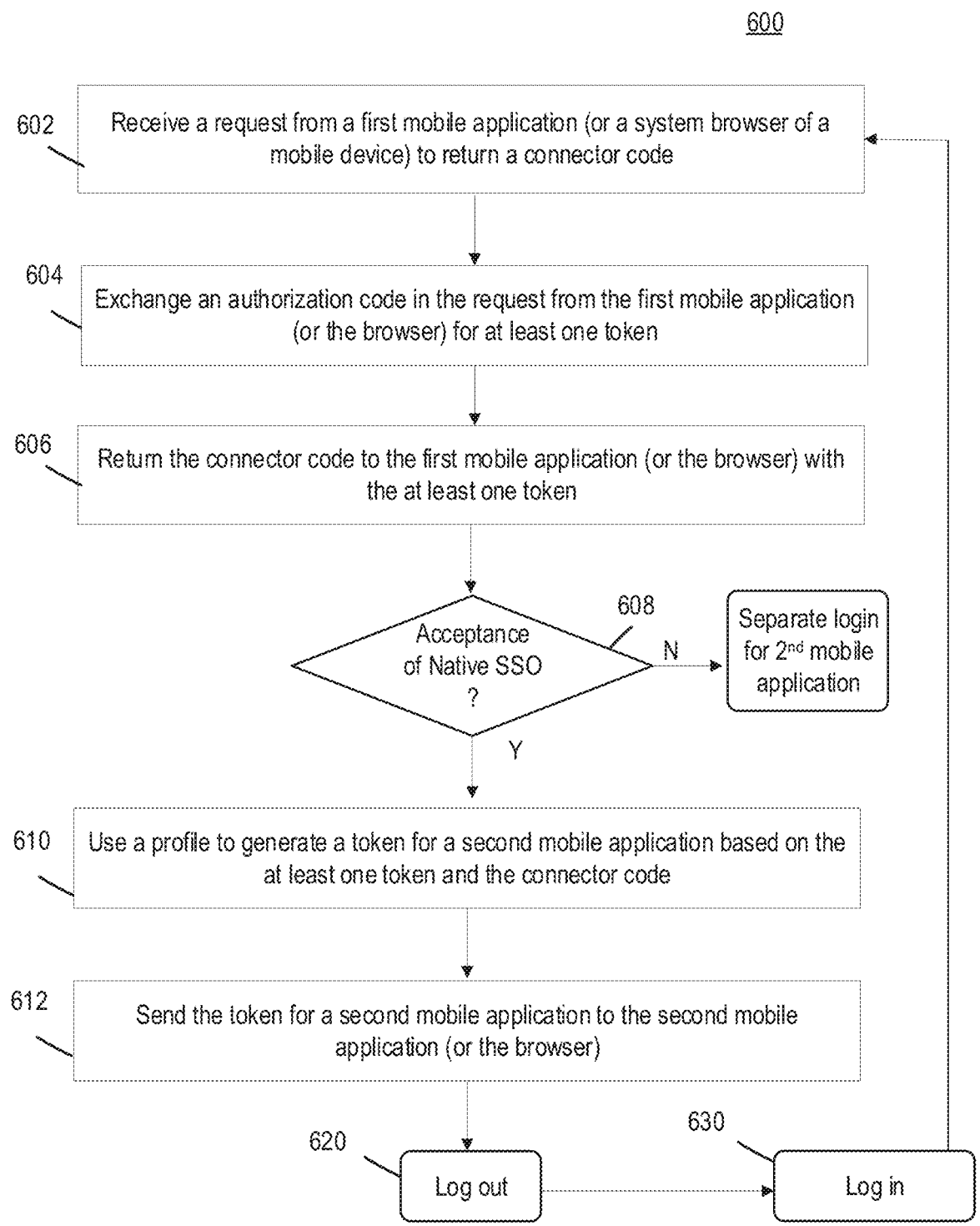

NATIVE SINGLE SIGN-ON (SSO) FOR MOBILE APPLICATIONS

CROSS-REFERENCE TO RELATED APPLICATION

This application claims the benefit of priority from U.S. Provisional Patent Application No. 62/689,031, filed on Jun. 22, 2018, which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to single sign-on (SSO) for mobile applications.

BACKGROUND

In general, single sign-on (SSO) is used for access control of multiple software systems. Usually the software systems are related. With SSO, conventionally a user logs in with a username and password to access one or more software systems without using different usernames or passwords. Some examples of SSO are known to be implemented using the Lightweight Directory Access Protocol (LDAP), Security Assertion Markup Language (SAML) and OpenID Connect. Also, some versions of SSO can be implemented over IP networks using cookies. Cookies can be used when the applications share a common DNS parent domain.

Different mobile applications support different authentication mechanisms. SSO can be adaptable to facilitate storing credentials used for initial authentication, and translate such initial credentials to a diversity of credentials used for different authentication methods.

Some known protocols and standards for access delegation allow for SSO across mobile applications by using session cookies. However, such known techniques have risks such as a user clearing a cookie from the system hosting the applications. Also, cookies are sometimes avoided altogether when using private browsing by some system browsers.

SUMMARY

Described herein is a token exchange mechanism using a shared security mechanism, a connector code and a token exchange profile to improve SSO for mobile applications. The token exchange mechanism allows mobile applications to share a common identity (such as a vendor identity) between mobile applications, so that a first mobile application can share an identity and/or authentication with a second mobile application. Consequently, such sharing enhances SSO for mobile applications.

In some embodiments, the token exchange mechanism allows mobile applications to share an identity and/or authentication between themselves when the applications are produced by a common vendor and signed with the same vendor certifications. This allows a user to log in once to mobile applications distributed by the same vendor and hence an improved SSO is implemented. The improved SSO is described as native SSO in some parts of this disclosure.

The token exchange mechanism, which enables native SSO, can avoid faults in known protocols and standards for access delegation such as those protocols and standards using cookies for sharing vendor identity over mobile applications. The improved token exchange can use a shared security mechanism for sharing vendor identity over mobile applications without some of the pitfalls of using cookies. In some example embodiments, the shared security mechanism can include a keychain or keystore. Also, a connector code can bind the mobile applications to each other so that only native SSO is required for a user to log in to the mobile applications and remain logged in to the applications on a mobile device. Also, the native SSO can be enhanced by the native SSO profile described herein.

In accordance with one or more embodiments, this disclosure provides computerized methods for native SSO for mobile applications as well as a non-transitory computer-readable storage medium for carrying out technical steps of the native SSO. The non-transitory computer-readable storage medium has tangibly stored thereon, or tangibly encoded thereon, computer readable instructions that when executed by a device (e.g., authorization server, client device, mobile device, and the like) cause at least one processor to perform a method for a novel and improved SSO using a shared security mechanism, a connector code and a token exchange profile (e.g., the native SSO profile).

In accordance with one or more embodiments, a system is provided that comprises one or more computing devices configured to provide functionality in accordance with one or more embodiments of a novel and improved SSO using a shared security mechanism, a connector code and a token exchange profile.

In accordance with one or more embodiments, functionality is embodied in steps of a method performed by at least one computing device. In accordance with one or more embodiments, program code (or program logic) executed by processor(s) of a computing device to implement functionality in accordance with one or more embodiments described herein is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 5 is a flowchart illustrating operations that can be performed by at least mobile applications or a system browser in accordance with some embodiments of the present disclosure; and FIG. 6 is a flowchart illustrating operations that can be performed by at least an authorization server or the like in accordance with some embodiments of the present disclosure.

DESCRIPTION OF EMBODIMENTS

Figure 1:
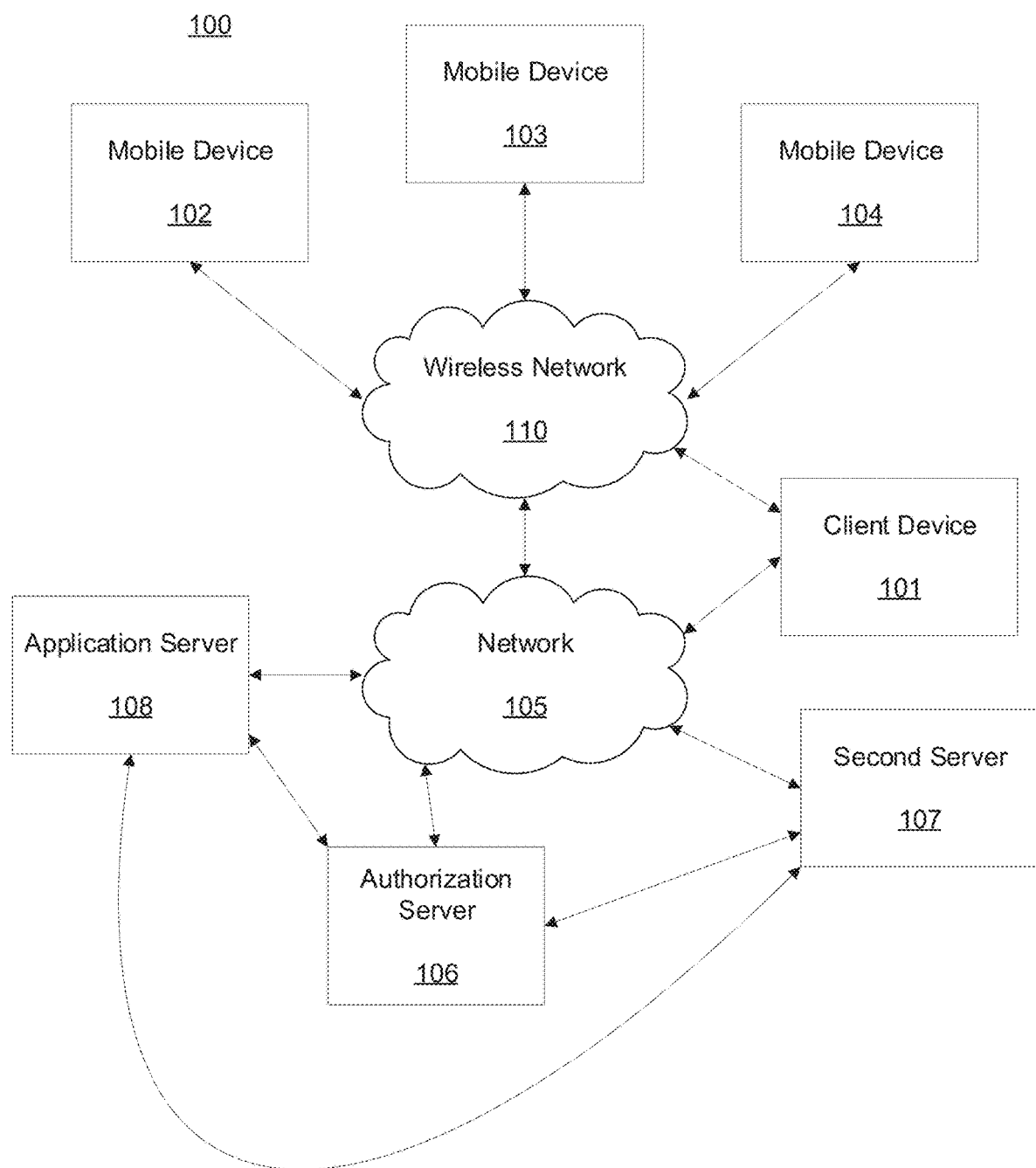
FIG. 1 is a schematic diagram illustrating an example of a network within which systems and methods disclosed herein can be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ standalone adhoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

For purposes of this disclosure, a mobile device is or includes a client device that is small enough to be held and operated by one or two hands of a person. In some examples, a mobile device has a touchscreen interface with digitally derived buttons and keyboard or physical buttons along with a physical keyboard or keypad. A mobile device can connect to the Internet and interconnect with other devices such as an Internet of Things (IoT) device or another type of network connected device via Wi-Fi, Bluetooth, cellular networks or near field communication (NFC). A camera and other types of sensors, as well as digital media players and parts of a Global Positioning System (GPS) can be included in a mobile device. Power can be provided to a mobile device by a battery or other wireless power source such a solar power source. A mobile device can run a mobile operating system that allows third-party mobile applications such as applications from a same vendor to be installed and run on the mobile device.

In some embodiments, the mobile applications described herein can include one or more advertisements. For purposes of this disclosure, an advertisement should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The disclosed systems and methods provide a novel and improved framework for sharing identity and/or authentication between mobile applications such as mobile applications produced by the same vendor or a certain group of vendors. The framework can be an improvement over known frameworks, such as frameworks that use cookies for sharing identity and/or authentication between mobile applications.

As discussed in more detail below, the disclosed systems and methods provide advanced functionality, from an identity and/or authentication platform, for improved sharing of identity and/or authentication between at least two mobile applications having an identifiable common connection such as being produce by the same vendor.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (e.g., handheld client devices) 102, 103, and 104 and client device 101. FIG. 1 additionally includes a variety of servers, such as an authorization server 106, a second server 107 (which could be secondary authorization server solely or combined with another type of server such as an application server or a content server), and an application (or "App") server 108.

Each of the mobile devices 102-104 and the client device 101 can include a device that includes a configuration to perform at least some of the operations of process 500 of FIG. 5. Also, each of the mobile devices 102-104 and the client device 101 can include a device that includes a configuration to perform at least some of the operations of process 400 performed by the first mobile application 402, the second mobile application 404, and the system browser 406 in FIG. 4.

The authorization server 106 and/or the second server 107 can include a device that includes a configuration to perform at least some of the operations of process 600 of FIG. 6. Also, the authorization server 106 and/or the second server 107 can include a device that includes a configuration to perform at least some of the operations of process 400 performed by the authorization server 408 in FIG. 4.

An embodiment of mobile devices 102-104 and client device 101 is described in more detail below.

Generally, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or another mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple authorization server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refer to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

As mentioned herein, the authorization server 106 and/or the second server 107 can include a device that includes a configuration to perform at least some of the operations of process 600. Also, the authorization server 106 and/or the second server 107 can include a device that includes a configuration to perform at least some of the operations of process 400 performed by the authorization server 408.

The application server 108 and/or the second server 107 can include a device that includes a configuration to provide content such as interactive content via a network to another device. Such server(s) may, for example, host a site, service or an associated application, such as, an email platform (e.g., Yahoo!® Mail), a social networking site, a photo sharing site/service (e.g., Tumblr®), a search platform or site, or a personal user site (such as a blog, vlog, online dating site, and the like) and the like. Such server(s) may also host a variety of other sites, including, but not limited to business sites, educational sites, dictionary sites, encyclopedia sites, wikis, financial sites, government sites, and the like. Devices that may operate as such server(s) include personal computers desktop computers, multiprocessor systems, microprocessor-based or programmable consumer electronics, network PCs, servers, and the like.

The application server 108 and/or the second server 107 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical states, for example.

Also, the application server 108 and/or the second server 107 can include an ad server such as a server that stores online advertisements for presentation to users. "Ad serving" provided by an ad server refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available. Such functionality can be provided by at least one of the servers 107 and 108.

Servers 106, 107, and 108 can be capable of sending or receiving signals, such as via a wired or wireless network, or can be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 107, and/or 108. This may include in a non-limiting example, authentication servers, search-servers, email servers, social networking services servers, SMS servers, IM servers, MMS servers, exchange servers, photo-sharing services servers, and travel services servers, via the network 105 using their various devices 101-104. In some embodiments, applications, such as a mail or messaging application (e.g., Yahoo!® Mail, Yahoo!® Messenger), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), and the like, can be hosted by the application server 108 (or a second server 107 such as one include a content server, message server and the like). Thus, the application server 108 can store various types of applications and application related information including application data and user profile information (e.g., identifying and behavioral information associated with a user). It should also be understood that server 107 can also store various types of data related to the content and services provided by server 107 in an associated database. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 107, and 108.

Moreover, although FIG. 1 illustrates servers 106, 107, and 108 as single computing devices, respectively, the disclosure is not so limited. For example, one or more functions of servers 106, 107, and 108 may be distributed across one or more distinct computing devices. Moreover, in one embodiment, servers 106, 107, and/or 108 may be integrated into a single computing device, without departing from the scope of the present disclosure.

Figure 2:
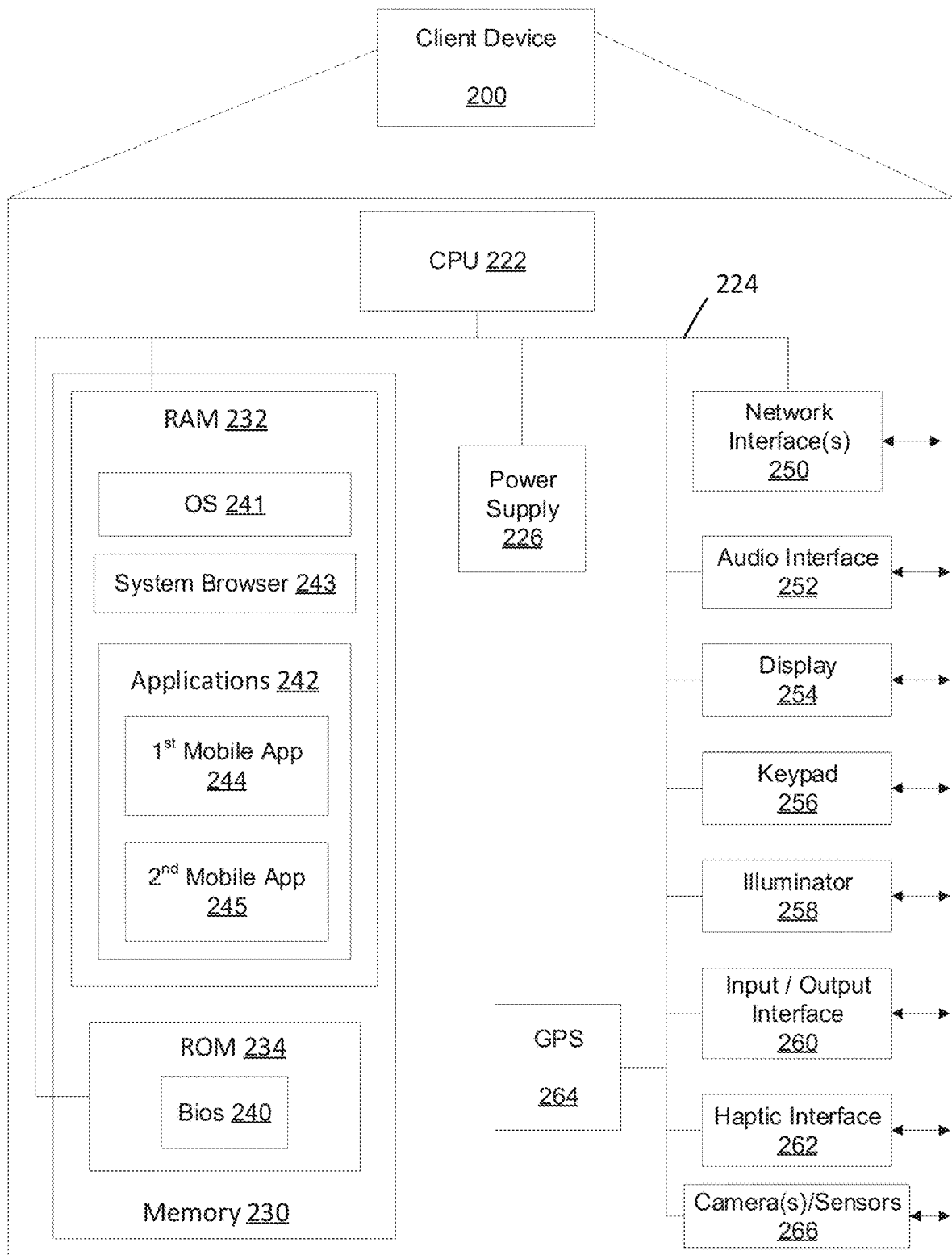
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing some aspects the present disclosure. Client device 200 may represent, for example, client and mobile devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 in RAM 232 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs. The mass memory also stores a system browser in RAM 232 for controlling operations of a system browser 243 and applications 242, such as controlling operations of a first mobile application 244 and a second mobile application 245.

Memory 230 further includes one or more data stores, which can be utilized by client device 200 to store, among other things, the system browser 243, the applications 242 (such as applications 244 and 245) and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242, such as the first mobile application 244 and the second mobile application 245, may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Application 244 or 245 may include a search client that is configured to send, to receive, and/or to otherwise process a search query and/or search result using any known or to be known communication protocols. It should be clear that multiple search clients may be employed by application 244 and/or 245. For example, one search client may be configured to enter a search query message, where another search client manages search results, and yet another search client is configured to manage serving digital content (e.g., advertisements) or other forms of digital data associated with, but not limited to, IMs, emails, and other types of known messages, or the like. Each search client may be implemented by a separate one of either application 244 or 245.

Figure 3:
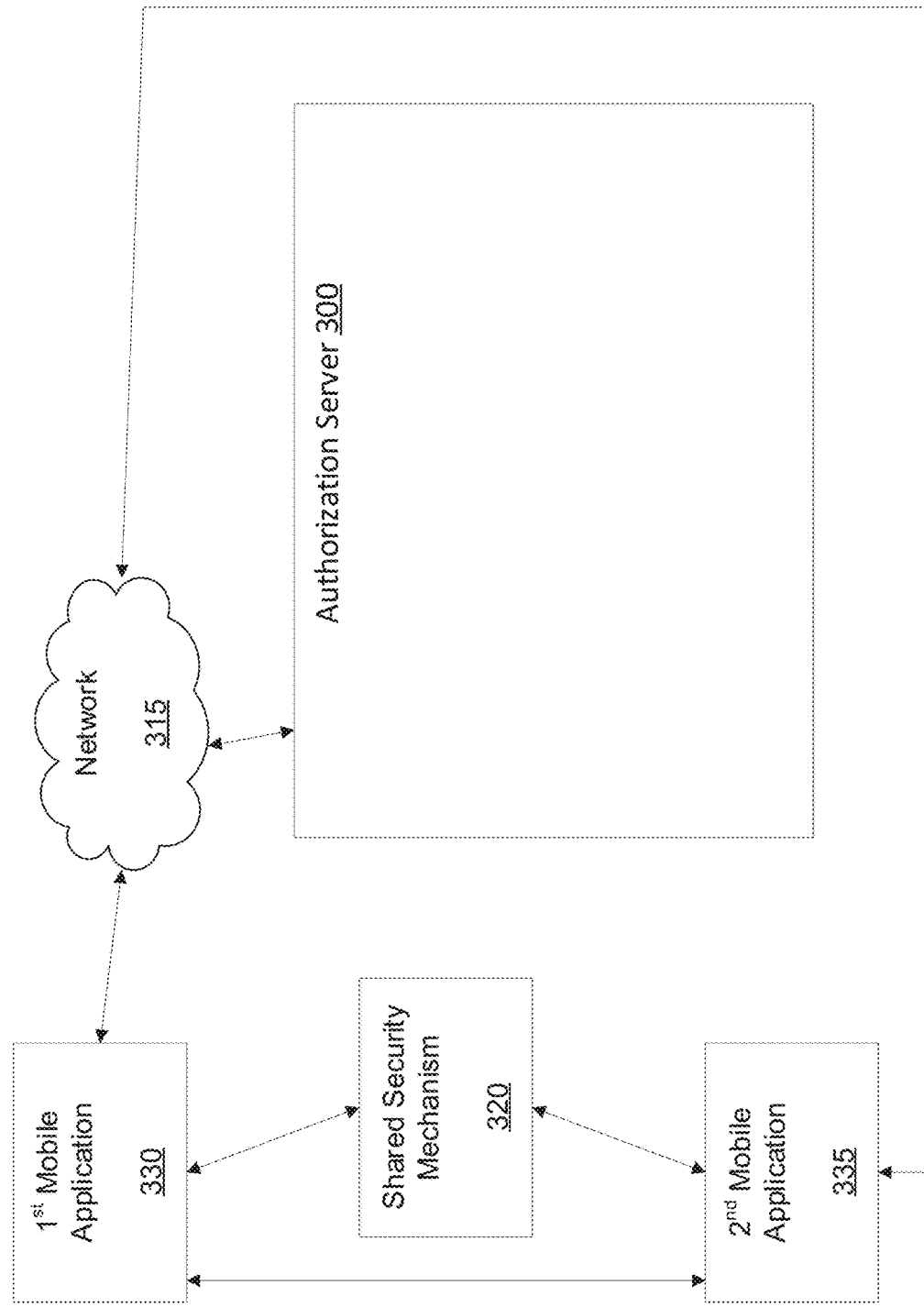
FIG. 3 is a schematic block diagram illustrating components of an exemplary system in accordance with some embodiments of the present disclosure.

FIG. 3 is a block diagram illustrating the components for performing the systems and methods discussed herein. FIG. 3 includes an authorization server 300 (such as authorization server 106), network 315 (such as network 105), a shared security mechanism 320 as well as first and second mobile applications 330 and 335 (e.g., mobile applications 244 and 245). The authorization server 300 can be a special purpose machine or processor and could be hosted by a messaging server, application server, content server, social networking server, web server, search server, content provider, email service provider, ad server, user's computing device, and the like, or any combination thereof.

According to some embodiments, authorization server 300 can be embodied as a stand-alone application that executes on a user device. In some embodiments, the authorization server 300 can function as an application installed on the user's device, and in some embodiments, such application can be a web-based application accessed by the user device over a network. In some embodiments, the authorization server 300 can be installed as an augmenting script, program or application to a messaging and/or media content hosting/serving application, such as, for example, Yahoo!® Mail, Yahoo!® Messenger, Yahoo!® Search, Flickr®, Tumblr®, Twitter®, Instagram®, SnapChat®, Facebook®, and the like.

The shared security mechanism 320 can include keychain, keystore, or any other type of shared security mechanism and can include or be a part of a database or memory, and is associated with a user's device (e.g., device 101-104 or device 200 from FIG. 2). In some less exemplary embodiments, the shared security mechanism 320 can be associated with any one of the applications 330 and 335, the authorization server 300, or any other type of server such as the servers described with reference to FIG. 1. In some embodiments, although not depicted in FIG. 2, the shared security mechanism 320 can be part of the RAM 232 of client device 200. The shared security mechanism 320 can comprise, for example, a dataset of authentication and/or identity items such as tokens, device data and associated metadata, and user data and associated user metadata as well as any combination thereof. Such information can be stored in the shared security mechanism 320 independently and/or as a linked or associated dataset. It should be understood that the data (and metadata) in the shared security mechanism 320 can be associated with any type of content, user, device or network information and type, whether known or to be known, without departing from the scope of the present disclosure.

Shared security mechanism 320 comprises a dataset of data and metadata associated with authentication and/or identity items. For purposes of the present disclosure, reference to authentication and/or identity items will also be made with regard to tokens and/or codes; however, it should not be construed to limit the applications of the systems and methods discussed herein. While reference is made throughout the instant disclosure to authentication and/or identity items, tokens and/or codes, other forms of authentication credentials can be communicated and/or accessed and processed by the authorization server 300 and other devices and applications according to the systems and methods discussed herein.

The authentication and/or identity items, tokens and/or codes, and the data and metadata of such things processed according to the disclosed systems and methods, and stored in a shared security mechanism 320, can be any type of authentication credentials. Examples of such authentication credentials can include, but are not limited to, credentials for single-, two-, or multi-factor authentication, strong authentication, continuous authentication, factual authentication, video authentication, or some combination thereof. Credentials can simply be a user name and a password or very complex. More complex credentials can include a digital artifact, such as a digital seal, signature, watermark, or fingerprint. Also, for instance, the credentials can include a shared secret, such as a shared passphrase, or an electronic signature. Also, the credentials can be based on a public-key infrastructure can also be used to cryptographically guarantee that a message has been signed by the holder of a particular private key.

The credentials can be provided to the server 300 or accessed by a computer program or device that can access the credentials. In some embodiments, the authentication credentials can be stored in a database, which is associated with one or more applications providers.

The shared security mechanism 320 can also comprise a dataset of data and metadata associated with local and/or network information related to users (such as end-users), devices, services, applications, user-generated content, third party provided content, and the like. Such information can be stored and/or indexed in the shared security mechanism 320 independently and/or as a linked or associated dataset. As discussed above, it should be understood that the data (and metadata) in the shared security mechanism 320 can be any type of information and type, whether known or to be known, without departing from the scope of the present disclosure.

According to some embodiments, the shared security mechanism 320 can include a database that can store data for users, i.e., user data. According to some embodiments, the stored user data can include, but is not limited to, information associated with a user's profile, user account(s), user interests, user behavioral information, user attributes, user preferences or settings, user demographic information, user location information, user biographic information, and the like, or some combination thereof. Such information can be incorporated into authentication and identity credentials.

According to some embodiments, the user data can also include, for purposes searching, receiving and/or displaying messages via applications, rendering and/or displaying content via applications, and/or downloading, streaming and/or accessing applications on or over the network, device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database that can be associated with the shared security mechanism 320 can be any type of information related to a user, content, a device, an application, a service provider, a content provider, whether known or to be known, without departing from the scope of the present disclosure.

According to some embodiments, a database can be associated with the authorization server 300 (which is not shown in FIG. 3) and such a database can include information associated with content providers, such as, but not limited to, messaging platforms, applications, sites, or providers that enable users to send, receive, search for, upload, download, share, edit or otherwise avail users to content (e.g., Yahoo!® Search, Yahoo!® Mobile applications, Yahoo!® Mail, Flickr®, Tumblr®, Twitter®, Instagram®, SnapChat®, Facebook®, and the like). In some embodiments, such a database can comprise data and metadata associated with such information from one and/or an assortment of media hosting sites. In some embodiments, such content provider information can include, but is not limited to, versions, types and/or capabilities of applications that are resident or accessed by a user device, and/or are capable of being downloaded, executed, accessed or run on user device for purposes of rendering content.

In some embodiments, the information stored in a database associated with authorization server 300 and/or the shared security mechanism 320 can be represented as an n-dimensional vector (or feature vector) for each stored data/metadata item, where the information associated with, for example, the stored data and/or metadata can correspond to a node(s) on the vector. Such a database can store and index stored information in the database as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion of some embodiments involves vector analysis of stored information, as discussed above, the information can be analyzed, stored and indexed according to any known or to be known computational analysis technique or algorithm, such as, but not limited to, word2vec analysis, cluster analysis, data mining, Bayesian network analysis, Hidden Markov models, artificial neural network analysis, logical model and/or tree analysis, and the like.

In some embodiments, a database associated with the shared security mechanism 320 and/or the authorization server 300 can be a single database housing information associated with one or more devices, users, services and/or content providers, and in some embodiments, the database can be configured as a linked set of data stores that provides such information, as each datastore in the set is associated with and/or unique to a specific user, device, service and/or content provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the authorization server 300, and the mobile applications 330 and 335 as well as any associated database and system browser. As illustrated in FIG. 3, the server 300 and shared security mechanism 320 as well as the applications 330 and 335 can be directly connected by any known or to be known method of connecting and/or enabling communication between such devices and resources.

Figure 4:
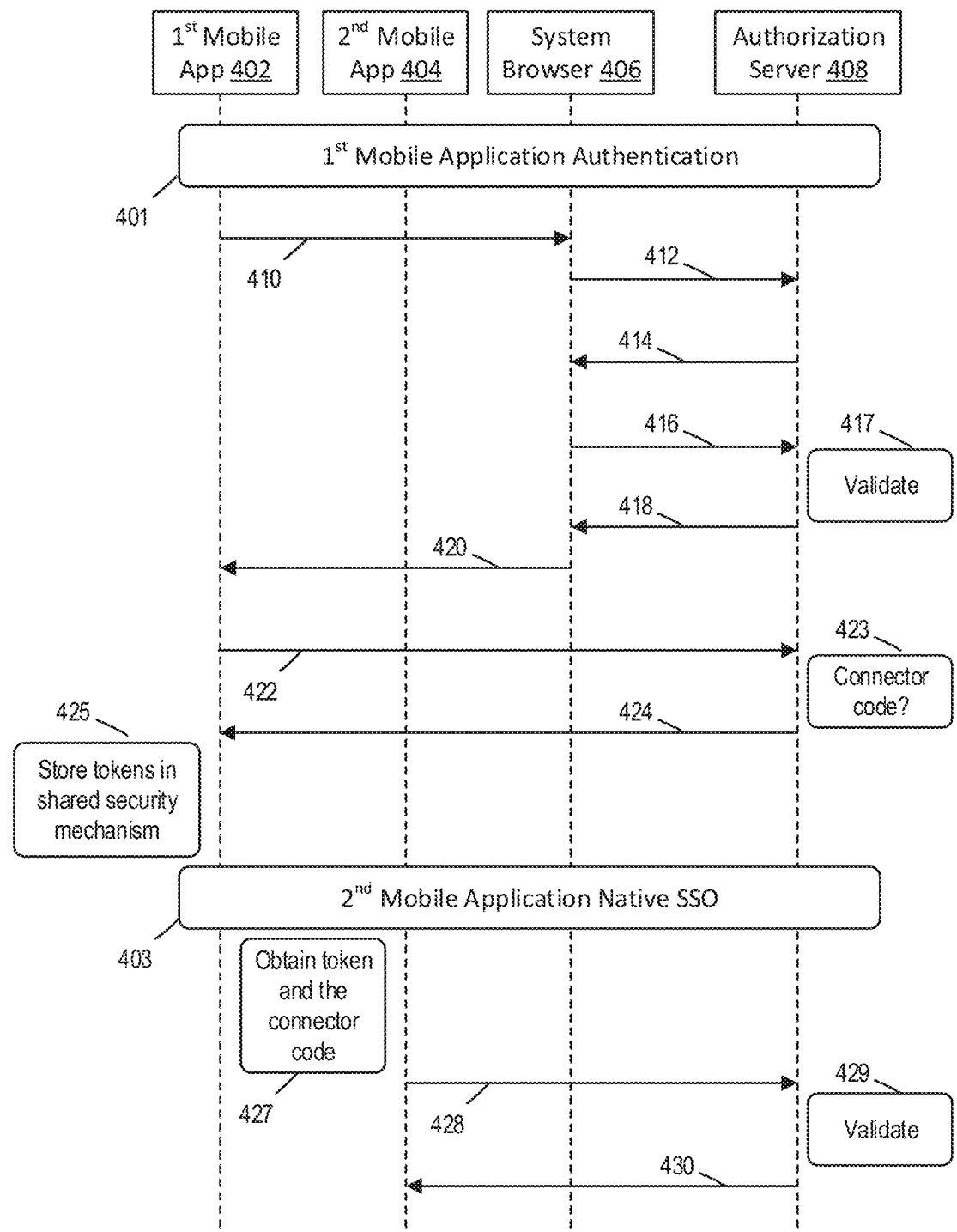
FIG. 4 is a flowchart illustrating operations that can be performed by at least mobile applications, a system browser, and an authorization server in accordance with some embodiments of the present disclosure.

The principal processor, server, or combination of devices that comprises hardware programmed in accordance with some the special purpose functions described herein is referred to for convenience as the authorization server 300, and the server can include specific modules for performing functions associated with the process 600 of FIG. 6 and some of the processes of FIG. 4 performed by the authorization server 408.

The device(s) that comprise hardware programmed in accordance with some the special purpose functions described herein are referred to for convenience as the first mobile application 330, the second mobile application 335, and the shared security mechanism 320, and these devices can each include specific modules for performing functions associated with the process 500 of FIG. 5 and some of the processes of FIG. 4 performed by the first mobile application 402, the second mobile application 404, or the system browser 406.

Having described components of the architecture employed within the disclosed systems and methods, the components' operations with respect to the disclosed systems and methods will now be described below with reference to FIGS. 4-6.

Turning to FIG. 4, process 400 details steps performed in accordance with some embodiments of the present disclosure for allowing a first mobile application 402 (e.g., one of the first mobile applications illustrated in FIGS. 2 and 3) to share an identity and/or authentication with a second mobile application 404 (e.g., one of the second mobile applications illustrated in FIGS. 2 and 3). The process 400 is especially useful when the first and second applications 402 and 404 are issued by a same vendor. In some embodiments, the mobile applications 402 and 404 can use standard features under RFC 8252 and OAuth 2.0. Also, in such embodiments, the authorization server 408 (e.g., one of the authorization servers of FIG. 1 or 3) can be a server defined in RFC 6749 and the OAuth 2.0 Authorization Framework.

Step 401 of process 400, which includes the authentication of a first mobile application, is performed by a combination of the first mobile device 402, the system browser 406 (e.g., the system browser of FIG. 2 or 3), and the authorization server 408. Step 403 of process 400, which includes the authentication of a second mobile application using the native SSO, is performed by a combination of at least the second mobile device 404 and the authorization server 408. Step 401 includes sub-steps 410-425, and step 403 includes sub-steps 427-430 as shown in FIG. 4. The steps and sub-steps of process 400 are an ordered combination of steps with the step 403 occurring after to step 401 and depending on step 401. Also, with respect to the sub-steps, step 430 depends on step 429, step 429 depends on step 428, step 428 depends on step 427, step 427 depends on step 425, step 425 depends on step 424, step 423 depends on step 422, step 422 depends on step 420, step 420 depends on step 418, step 418 depends on step 417, step 417 depends on step 416, step 416 depends on step 414, step 414 depends on step 412, and step 412 depends on step 410.

With respect to the sub-steps, step 410 includes an interaction (such as a negotiation) between the first mobile application 402 and the system browser 406. Steps 412, 414, 416, and 418 include an interaction (such as a negotiation) between the system browser 406 and the authorization server 408. Step 420 includes an interaction (such as a negotiation) between the browser 406 and the first mobile application 402. Steps 422 and 424 include an interaction (such as a negotiation) between the authorization server 408 and the first mobile application 402. And, Steps 428 and 430 include an interaction (such as a negotiation) between the second mobile application 404 and the authorization server 408. The authorization server 408 independently performs steps 417, 423, and 429. The first mobile application is interacting with a shared security mechanism (which is not depicted in FIG. 4) at step 425 directly, and the second mobile application is interacting with the shared security mechanism at step 427 directly.

The steps of FIG. 4 can be implemented by an authentication layer of an authorization framework such as OpenID Connect (OIDC) on top of OAuth 2.0 authorization framework. In examples embodiments using OIDC, OIDC is used as an identity layer on top of an OAuth protocol such as the OAuth 2.0 protocol. The OIDC allows computing clients, such as the system browser 406 and the first mobile application 402, to verify the identity of a user (such as an end-user) based on the authentication performed by the authorization server 408. It also obtains basic profile information about the user in an interoperable manner. In an example, the OIDC uses a RESTFUL HTTP API that uses JavaScript Object Notation (JSON) for a data-interchange format. In other embodiments, another type of authentication layer of another framework can be used to verify identity and obtain profile information of the user in an interoperable manner.

The authentication layer provides clients, including the mobile applications (e.g., applications 402 and 404) and the system browsers described herein (e.g., browser 406), to request and receive information about authenticated sessions and users. The authentication layer initially can be designed to implement the native SSO or can be a standard authentication layer that is extensible to implement the native SSO. OIDC can be used in some exemplary embodiments, and it is useful because it supports optional features such as encryption of identity data and session management.

The Process 400 begins with step 401, which includes authentication of the first mobile application 402. As shown, step 401 can begin with step 410, which, as shown, includes the mobile application 402 sending a request to the system browser 406 to initiate an authentication of the first mobile application 402 through an authentication layer such as OIDC.

In step 412, as shown, the system browser 406 acts as a client requesting authentication from the authorization server 408 that is acting as an authentication services provider. For example, system browser 406 sends an OIDC formatted request to the authorization server 408. The request sent at step 412 can include a specific device SSO scope parameter. In some embodiments, the specific device SSO scope parameter identifies to the authentication provider that the client is requesting a connector code such as a device secret parameter when an authorization code of the request is exchanged for a token by the authentication services provider. Again, in the example illustrated in FIG. 4, the authorization server 408 is the authentication services provider.

Also, when using OIDC, the client uses the HTTP Basic Authentication method from RFC 6749 to authenticate the client making the request to the token endpoint, which in the example of FIG. 4 the token endpoints are illustrated by the mobile applications 402 and 404. In some examples, the mobile applications 402 and 404 are using Proof Key for Code Exchange (PKCE) as the client authentication mechanism. When using PKCE, the mobile applications do not have a secret and will only specify the client_id parameters in the HTTP authorization header. The client_id can include a client code associated with a same vendor for the first mobile application 402 and the second mobile application 404.

As mentioned herein, the authentication layer initially can be designed to implement the native SSO or can be a standard authentication layer that is extensible to implement the native SSO. Also, OIDC can be used in some exemplary embodiments, and it is useful because it supports optional features such as encryption of identity data and session management as well as extensions to add to OIDC authentication flow that can enable the second mobile application 404 to share the authentication of the first mobile application 402 such as when both mobile applications are signed by the same vendor certificates.

The disclosure herein defines a new scope value that is used to convey to the authentication services provider (such as authorization server 408) that when the authorization code is exchanged for a token, a new connector code (such as or including a new device secret parameter) will be returned in addition to the other tokens identified as part of the authorization request.

The new scope value can be defined as a specific device SSO scope parameter. When such a scope value is present on the authorization request, when the authorization code is exchanged for tokens, a new connector code will be returned.

The connector code (such as or including a new device secret parameter) contains relevant data to a device hosting mobile applications (such as anyone of the mobile or client devices described herein). The connector code can also include users authenticated with the device. The connector code can be completely hidden from the client, and in such embodiments, it can be encrypted. The encryption can be for the connector code's communication to and from the authentication services provider. In an example, the connector code can utilize a JSON Web Token (JWT) with encryption such as RSA encryption.

The connector code may be shared between mobile applications that can obtain the connector code via a shared security mechanism (e.g. a keychain or keystore). If a mobile application requests a connector code (such as by using at least a specific device SSO scope parameter) and a connector code exists, then the client can provide the connector code on the request to a token endpoint (such as the authorization server 408) to exchange code for tokens. The client can provide the connector code to the token endpoint during refresh token requests (such as refresh token requests implemented in steps 422 and 428).

In step 414, the authorization server 408 acting as the authentication services provider authenticates the user, the first mobile application 402, and/or the system browser 406 according to information sent to it in step 412, and obtains authorization for the user, the first mobile application, and/or the system browser through steps 416 and 417 as well. The authentication and authorization occurs between the system browser 406 and the authorization server 408 in the embodiment of FIG. 4, and includes the steps 414, 416, and 417. Specifically, in step 416, user credentials are sent to the authorization server for validation. And, step 417, includes the authorization server 408 validating the user credentials.

In step 418, as shown, the authorization server 408 sends a callback with code to the system browser 406, that then in turn in step 420 sends a callback with the code to the first mobile application 402. In general, an exchange code is sent with the callbacks and can include aspects of the information referred to in the discussion of steps 401-417.

In step 422, as shown in FIG. 4, the first mobile application 402 sends the exchange code, which can be or include the authorization code, to the authorization server 408 to receive tokens. The exchange code can include a client identification parameter, a grant type parameter, and/or a scopes parameter such as or including a connector code (e.g., a device secret parameter). In the context of OIDC, in step 422, the client (e.g., the first mobile device 402) can also send a request including the Access Token to a UserInfo Endpoint (e.g., the authorization server 408).

When the authorization server 408 receives the connector code, it can validate a requested token. If the token is invalid it must be discarded and the request processed as not having a valid connector code. In some examples, if the authorization request included the SSO scope parameter then the connector code must be returned in the response. The connector code would then be returned with the requested token. But, this is only if the token is valid, in such examples. Also, in such examples, if no connector code is specified, then the authorization server can generate a new connector code for delivery with the token. If a connector code is specified and is valid, the authorization server updates the connector code as required by a selected protocol.

In step 424, the authorization server 408 returns authentication information about the user, the system browser 406, and/or the first mobile application 402 such as including the connector code. In the context of OIDC, the authorization server 408 is acting as the Token Endpoint and is returning tokens for the End-User. The tokens can include a Refresh Token, an Access Token, an ID Token, and the connector code.

Step 423 includes the authorization server determining whether the request of step 422 includes a connector code or any type of scopes parameter specific to native SSO. If the connector code and/or the specific scopes parameter exists in the request, then that code can be sent in the communication of step 424. In some embodiments, the connector code and/or the specific scopes parameter can be refreshed in step 423. Otherwise, if the connector code and/or the specific scopes parameter do not exist in the request, then a new connector code can be generated by the authorization server 408 or a second server connected to the authorization server.

Subsequent or during a user authentication via the system browser 406 such as in steps 412-418 and after the first mobile application 402 receives the exchange code and in some embodiments a state response from the authorization server 408, a native SSO extension defines the following additional parameters for sending to the token endpoint and such additional parameter can be implemented through the authorization code and grant type parameters of OIDC. As mentioned, one of the additional parameters can include a connector code such as a device secret.

In the context OIDC, a token may be provided if the client requested the device SSO scope and the client already has a connector code available. If no connector code is specified, a new connector code will be generated such as in step 423. In such a context, when the authorization server 408 receives the connector code, it also processes the authorization code and grant type per the OIDC specification with certain other parameters associated with the identification token.

The other parameters can include an added hash value or function (such as a 'ds_hash' claim) to the identification token (i.e., 'id_token') to represent a function of the device identifier. The hash object or function can provide a binding between the identification token and the connector code. The actual binding implemented by the hash function or object is not specified by a corresponding profile communicated from the client to the authorization server. As the binding is managed solely by the authorization server or a trusted second server connected to the authorization server. The authorization server can determine and select how to protect the relationship between the identification token and the connector code. The hash parameter can be encrypted.

The other parameters can also include a session identification parameter that can be added to the identification token that can represent the user's current authentication session. The session identification parameter can include a string that uniquely identifies the user's authentication session. The value can be used in logout flows as well as one or more of the process flows described herein. For mobile applications where there is not explicit browser authentication, the session identification parameter can represent the underlying session associated with a refresh token such as a refresh token specified under the OIDC specification. The session identification parameter can be encrypted.

In step 425, the first mobile application 402, the system browser, or the authorization server 408 stores the tokens with the connector code in a shared security mechanism such as a keychain or a keystore. The shared security mechanism can be part of a mobile device hosting the mobile applications. Also, the shared security mechanism can be remote from the mobile device in some less exemplary embodiments.

The process 400, after step 425 turns to step 403, which includes authentication of the second mobile application 404 using specific functions of the native SSO. As shown, step 403 can begin with step 427, which, as shown, includes the second mobile application 404 obtaining stored token(s) and the connector code from the shared security mechanism. This initiates an authentication of the second mobile application 404 through the authentication layer. In some exemplary embodiments the authentication layer is implemented by OIDC.

In step 403, processing rules of the native SSO are used by at least the second mobile application 404 and the authorization server 408 to exchange a previous authentication of the first mobile device 402 for new refresh and access tokens requested by the second mobile application. The new refresh and access tokens can be created by the same vendor as both applications can be electronically signed by the same developer key.

Referring back step 427, the second mobile application 404 obtains the identification token and the connector code (e.g., the device secret parameter) from the shared security mechanism (e.g., mobile device keychain, keystore, etc.). And, then based on the obtained information from step 427 solely or combined with additional information from any one or more of the sub-steps from step 401 (the authentication of the first mobile application), the second mobile application generates a native SSO profile.

The native SSO profile uses a set of token exchange parameters to implement in part step 403. In an exemplary embodiment, OIDC can be the basis for deriving the token exchange parameters of the profile. The token exchange parameters include a grant type parameter and an audience parameter that can define the logical purview of the returned tokens. In some examples, the audience parameter is the issuer URI for the OIDC provider that issued the identification token used in the profile. For instance, the audience parameter is the URI for authorization server 408.

The token exchange parameters of the profile also include a subject token that can include the identification token obtained by the first mobile application 402. In some embodiment using OIDC, the identification token is used in a same manner as an id_token_hint of OIDC. The identification token can identify the user for SSO for invoking the second mobile application 404 as well as the first mobile application 402 if the first application is logged out. The token exchange parameters of the profile can also include subject type token, such as subject_token_type of OIDC.

The token exchange parameters of the profile also include an actor token. The actor token defines the actor making the request. For instance, the actor making the request can be a specific mobile device associated with the connector code. In such a case, the connector code included in the actor token includes or is a device secret parameter. The actor can also be the second mobile application 404 and/or the system browser hosting the second application and the connector code of the actor token is issued for the device and/or the mobile application or the system browser depending of the actor that makes the request for the tokens to invoke native SSO. In some examples, the exchange parameters also include an actor type token such as an OIDC Actor_token_type parameter. The token exchange parameters of the profile also include the scopes parameter. The scopes parameter can define the scopes required by the requesting mobile application. In the case of steps under step 403, the requesting mobile application is the second mobile application 404.

In embodiments using OIDC, the requested_token_type parameter can be expressly omitted from the profile.

In step 428, as shown, the second mobile application 404 acts as a client requesting authentication from the authorization server 408 that is acting as an authentication services provider. For example, an OIDC formatted request can be sent to the authorization server 408 from the second mobile application 404. The request communication sent at step 428 can include the token exchange parameters of the profile.

In step 429, when the authorization server 408 receives the communication sent in step 428 from the second mobile application 404, it can validate a requested corresponding token. If the token is invalid it must be discarded and the request processed as not having a valid connector code.

In step 430, the authorization server 408 returns authentication information about the user and/or the second mobile application 404 such as including the connector code. In the context of OIDC, the authorization server 408 is acting as an Token Endpoint again and is returning claims about the user using native SSO and based on the native SSO profile. The claims can include a refresh token, an access token, an identification token, and the connector code.

Step 429 can include the authorization server determining whether the token exchange parameters of the profile include a valid connector code or a valid scopes parameter specific to native SSO. If a valid connector code and/or the specific scopes parameter exists in the token exchange parameters, then that parameters can be sent in the communication to second mobile application 404 in step 430. In some embodiments, the connector code and/or the specific scopes parameter can be refreshed in step 429. Otherwise, if a valid connector code and/or the specific scopes parameter does not exist in the token exchange parameters of the profile, then a new connector code and/or specific scopes parameter can be generated by the authorization server 408 or a second server connected to the authorization server in step 429.

Essentially, step 428 includes invocation, by the second mobile application of a token endpoint with the native SSO profile for token exchange by passing the identification token obtained from the shared security mechanism and/or shared device storage along with other parameters of the profile such as the connector code. Step 429 includes a validation of the information communicated to the authorization server 408 in step 428. Essentially, in step 429, the authorization server 408 is acting as the token endpoint. And, finally, in step 430, the authorization server 408 or possibly another token endpoint returns the SSO generated refresh and access tokens to invoke the second mobile application 404 through native SSO. These refresh and access tokens can at least include or be associated with the connector code. In general, according to most embodiments of the token exchange request for native SSO, when a mobile application wants to request native SSO (e.g., obtain refresh and access tokens for an already signed in user) it makes a standard authentication layer and endpoint request followed by generation of the native SSO profile for token exchange defined herein. The client identification parameter in such a request can simply be sent via a HTTP basic authentication method using a HTTP authorization header.

In some embodiments, step 429 can include validating the connector code, validating the session of the user and/or one or more of the applications 402 & 404 or the system browser 406, and validating the client identification token. When the authorization server 408 receives a request at the token endpoint conforming to the native SSO profile it performs a series of checks before issuing any tokens in general.

In some specific embodiments, the checks before issuing any tokens can include validation of the connector code to ensure the token is still valid. The format of the connector code can be defined by the authorization server 408. The checks can also include verification of the binding between the identification token and the connector code as defined in the extension to a standard token response such as a standard OIDC token response.

The checks can also include verifying that the session identification token in the identification token is valid. If the session is no longer valid, the authorization server 408 can return an error message.

The checks can also include validating that the client requesting native SSO, such as the second mobile application 404, is authorized to make such a request. Such authorization can occur through steps 427 and 428. The authorization server 408 may maintain a list of client identifications that can share user and/or mobile application authentications. For example, the authorization server may use the audience parameter from the identification token and the client identification from the token request and the use such information to verify that the client identifications (such as the client identifications of the mobile applications 402 and 404) are allowed to share user authentications.

The checks can also include verifying that the scopes requested by the client in the token request (either default scopes or explicitly specified in the optional scopes parameter) do not require explicit user consent such as through a user login interface. If any requested scopes require explicit user consent the authorization server may fail the request of the native SSO and return an error message indicating the lack of or the invalid scope of the request.

In some embodiments, based on a definition of the connector code provided by the authorization server 408, the authorization may perform addition checks to ensure the security of the request. Provided the above criteria of the native SSO profile is met, the authorization server 408 can issue a token response object containing a refresh token, access token and identification token issued to the client identification of the mobile application making the request, such as the identification of second mobile application 404. The session associated with the new refresh token may be the same as that used to verify the validity of the native SSO. If that session expires, all refresh tokens associated with the session are invalidated such as by the authorization server 408 at step 429. As an alternative to the identification token, the authorization server 408 or an associate second server can add a requested token type parameter and return the value of the identification token.

In such embodiments, in step 430, the token exchange response for the profile can include certain characteristics. The response can include an access parameter that includes the access token issued to the mobile client identified by the client identification sent in the authorization header. The response can also include an issued token type parameter that includes a certain preselected value including the value of the access token. The response can also include a token type such it is a bearer. The response can also include an indication of when the access token expires. The response can also include a scope parameter that follows the criteria of the native SSO. The response can also include a refresh token that the mobile application can use to obtain additional access tokens when the access token indicated in the response expires. The response also includes the connector code which can be or include a device secret parameter and can be a new or updated connector code. In some embodiments such as those implemented through OIDC, if any of the parameters of the response are not valid the authorization server can notify the user with a corresponding error message.

Turning to FIG. 5, process 500 details steps performed in accordance with some embodiments of the present disclosure for allowing a first mobile application to share an identity and/or authentication with a second mobile application. The process 500 is especially useful when the first and second applications are issued by a same vendor. Also, the process 500 can include some of the steps illustrated in FIG. 4.

Steps 502-506 of process 500 are performed by a first mobile application and/or a system browser (e.g., the first mobile application of FIG. 2, FIG. 3, or FIG. 4 and the system browser of FIG. 2 or FIG. 4). Steps 508-512 and 516 of process 500 are performed by a second mobile application and/or a system browser (e.g., the second mobile application of FIG. 2, FIG. 3, or FIG. 4 and the system browser of FIG. 2 or FIG. 4). Process 500 begins with step 502, which includes the first mobile application and/or a system browser requesting an authorization server to return a connector code. In some example embodiments, the connector code is unique to a specific mobile device, such as a specific mobile device hosting both the first and second mobile applications.

In step 504, the first mobile application and/or a system browser receives the connector code with at least one token from the authorization server or a second server. Such a code and token is returned by the authorization server when the request is valid. One way that the request can be valid is that it includes a code or some other form of credential that identifies that the first mobile application as being distributed by a particular vendor. In some embodiments, the at least one token identifies a user who is logged in to the first mobile application.

In step 506, the first mobile application and/or a system browser stores, in a shared security mechanism, the at least one token and the connector code. The shared security mechanism can include a keychain or a keystore.

In step 508, the second mobile application and/or a system browser searches in the shared security mechanism for the at least one token.

In step 510, the second mobile application and/or a system browser uses a profile to obtain a token for the second mobile application based on the at least one token and the connector code. For the profile to be valid, in some embodiments the second mobile application must be identified as distributed by the same vendor as the first mobile application. Also, in exemplary embodiments, the profile is a profile of a token exchange between the second application and the authorization server.

In example embodiments where the first and second applications are or must be issued by a same vendor, the process 500 can also include providing to the authorization server, by the profile, the at least one token, the connector code, and a client code associated with the same vendor of the first mobile application and the second mobile applications. These parameters can then be checked by the authorization server to validate the profile.

In step 512, the second mobile application queries the user to determine whether the user accepts use of the at least one token with the second mobile application.

In step 514, the second mobile application and/or a system browser determines whether the user accepts use of the at least one token with the second mobile application. If the user does not accept use of the at least one token with the second mobile application, the second mobile application and/or a system browser provides a separate login interface for the second mobile application. If the user does accept use of the at least one token with the second mobile application, the process 500 moves to step 516.

In step 516, the second mobile application and/or a system browser uses a profile to obtain a token for the second mobile application. In exemplary embodiments, the token must be validated by the authorization server (for example, a valid profile can be validated by the validation server when the first and second applications are from the same vendor). When valid tokens for the first and second mobile applications exist, the user remains logged in to both applications, respectively, without having to log in to the second mobile application with a separate login interface for the second mobile application. At this point, the native SSO has been implemented.

Not shown in FIG. 5, once the first and second mobile applications are logged in with valid tokens, either the first or second application and/or the system browser can request the authorization server to return a second connector code to receive the second connector code with at least one token from the authorization server or a second server, and so on, so that a third mobile application and/or the system browser can use a profile to obtain a token for the third mobile application based on the at least one token and the second connector code. In exemplary embodiments, the second connector code replaces the first connector code. Then, essentially steps 512-516 are repeated for the third mobile application. And, such steps can be repeated for additional mobile applications if such applications share a common identity (e.g., a same vendor identity).

If a respective token is unavailable for one of the applications the user can be logged out of the corresponding mobile application at step 520. The user can then log in to the mobile application at step 530, if the user is logged out such as by using a respective login interface for the mobile application. Once a user is logged in to one mobile application under the native SSO that application can be considered the first mobile application and the process 500 can be repeated for another mobile application (e.g., second mobile application) under the native SSO.

Turning to FIG. 6, process 600 details steps performed in accordance with some embodiments of the present disclosure for allowing a first mobile application to share an identity and/or authentication with a second mobile application. The process 600 is especially useful when the first and second applications are issued by a same vendor, but this is not necessary. Also, the process 600 can include some of the steps illustrated in FIG. 4. The process 600 can also be combinable with the process 500 in that actor(s) from the process 500 can interact with the actor(s) of the process 600. Process 400 is an example process that includes specific implementations of the combination of process 500 and process 600.

Steps 602-606 and 610-612 of process 600 are performed by an authorization server (e.g., the authorization server of FIG. 1, FIG. 3, or FIG. 4), a second server such as a second server with authorization capabilities, or some combination thereof. Step 608 can be performed by the server(s) or by the second mobile application (e.g., the second mobile application of FIG. 2, FIG. 3, or FIG. 4) and/or a system browser (e.g., the system browser of FIG. 2 or FIG. 4). Process 600 begins with step 602, which includes the server(s) receiving a request from a first mobile application (or a system browser of a mobile device) to return a connector code. In some example embodiments, the connector code is unique to a specific mobile device, such as a specific mobile device hosting both the first and second mobile applications.

In step 604, the server(s) exchange an authorization code in the request from the first mobile application (or the browser) for at least one token. In some embodiments, the at least one token identifies a user who is logged in to the first mobile application.

In step 606, the server(s) return the connector code to the first mobile application (or the browser) with the at least one token.

In step 608, the server(s) or the second mobile application and/or a system browser determines whether the user accepts use of the at least one token with the second mobile application. Where the server(s) are not performing the determination at step 608, the server(s) are at least receiving the determination from the application and/or the system browser. If the user does not accept use of the at least one token with the second mobile application, the second mobile application and/or a system browser provides a separate login interface for the second mobile application. If the user does accept use of the at least one token with the second mobile application, the process 600 moves to step 610.

In step 610, the server(s) use a profile to generate a token for a second mobile application based on the at least one token and the connector code. In exemplary embodiments, step 610 includes the server(s) validating the token. In an exemplary embodiment, a profile can be validated by the server(s) when the first and second applications are from the same vendor.

In step 612, the server(s) send the token for a second mobile application to the second mobile application (or the browser), so that the user for example is automatically logged in to the second mobile application without having to log in through a login interface for the second mobile application. When valid tokens for the first and second mobile applications exist, the user remains logged in to both applications, respectively, without having to log in to the second mobile application with a separate login interface for the second mobile application. At this point, the native SSO has been implemented.

Not shown in FIG. 6, once the first and second mobile applications are logged in with valid tokens and after receiving a request from the first or second application and/or the system browser (similar to step 602) as well as an exchange like the exchange of step 604 occurs, the server(s) can return a second connector code to the requesting actor(s) such that those actor(s) receive the second connector code with at least one token from the server(s), and so on, so that a third mobile application and/or the system browser can use a profile to obtain a token for the third mobile application based on the at least one token and the second connector code. Essentially, steps 606-612 are repeated for the third mobile application as well. And, such steps can be repeated for additional mobile applications if such applications share a common identity (e.g., a same vendor identity).

If a respective token is unavailable for one of the applications the user can be logged out of the corresponding mobile application at step 620. The user can then log in to the mobile application at step 630, if the user is logged out such as by using a respective login interface for the mobile application. Once a user is logged in to one mobile application under the native SSO that application can be considered the first mobile application and the process 600 can be repeated for another mobile application (e.g., second mobile application) under the native SSO.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method for enhanced single sign-on for mobile applications, the method comprising:
   transmitting, by a first mobile application, a request for an access token for the first mobile application to a remote server;
   receiving, by the first mobile application from the remote server, the access token for the first mobile application, a connector code and at least one other token from the remote server in response to the first mobile application's access token request;
   storing, by the first mobile application, in a shared security mechanism, the at least one other token and the connector code in a shared security mechanism;
   searching, by a second mobile application other than the first mobile application, in the shared security mechanism for the at least one other token and the connector code; and
   obtaining, by the second mobile application from the remote server, an access token for the second mobile application using a profile based at least in part on the at least one other token and the connector code received in connection with the first mobile application's authentication.

2. The method of claim 1 wherein the first mobile application's access token request is made by the first mobile application to the remote server which is an authorization server.

3. The method of claim 1 wherein the remote server is a second server.

4. The method of claim 1 wherein the first mobile application and second mobile application are issued by a same vendor.

5. The method of claim 1 wherein the shared security mechanism comprises a keychain.

6. The method of claim 1 wherein the shared security mechanism comprises a keystore.

7. The method of claim 1 wherein the connector code is unique to a specific mobile device.

8. The method of claim 1 wherein the at least one other token identifies a user who is logged in to the first mobile application.

9. The method of claim 8, further comprising querying, by the second mobile application, the user to determine whether the user accepts use of the at least one other token with the second mobile application, and not using a profile to obtain an access token for the second mobile application without acceptance of use of the at least one other token with the second mobile application by the user.

10. The method of claim 2, wherein the profile is a profile of a token exchange between the second mobile application and the authorization server.

11. The method of claim 10, wherein the first mobile application and second mobile application are issued by a same vendor and wherein the method further comprises providing to the authorization server, by the profile, the at least one other token, the connector code, and a client code associated with the same vendor of the first mobile application and the second mobile application.

12. A non-transitory computer-readable storage medium tangibly encoded with computer-executable instructions, that when executed by a processor associated with a computing device, performs a method for enhanced single sign-on for mobile applications, the method comprising:
   receiving, by an authorization server and from a first mobile application, a request for an access token for the first mobile application;
   returning, by the authorization server, the access token for the first mobile application, a connector code and at least one other token to the first mobile application in response to the first mobile application's access token request, wherein the at least one other token and the connector code are stored in a shared security mechanism accessible by a second mobile application other than the first mobile application;
   receiving, by the authorization server and from the second mobile application, a request for an access token for the second mobile application, the request comprising a profile that is based at least in part on the at least one other token and the connector code; and
   using, by the authorization server, the profile that is based at least in part on the at least one other token and the connector code to generate an access token for the second mobile application.

13. The non-transitory computer-readable storage medium of claim 12 further comprising sending to the second mobile application, by the authorization server, the access token for the second mobile application, wherein the access token for the second mobile application is stored in the shared security mechanism by the second mobile application.

14. The non-transitory computer-readable storage medium of claim 12 wherein the request for an access token for the first mobile application comprises an authorization code, and the request for an access token for the first mobile application comprises a request to exchange the authorization code for the first mobile application's access token, the connector code and the at least one other token.

15. The non-transitory computer-readable storage medium of claim 12 wherein the connector code is unique to a specific mobile device.

16. A computing device comprising:
   a processor; and
   a non-transitory computer-readable storage medium for tangibly storing thereon program logic for execution by the processor, the program logic comprising:
      executable logic for receiving a request from a first mobile application for an access token for the first mobile application;
      executable logic for returning the access token for the first mobile application, a connector code and at least one other token to the first mobile application in response to the first mobile application's access token request, wherein the at least one other token and the connector code are stored in a shared security mechanism accessible by a second mobile application other than the first mobile application;
      executable logic for receiving, from the second mobile application, a request for an access token for the second mobile application, the request comprising a profile that is based at least in part on the at least one other token and the connector code; and
      executable logic for using the profile that is based at least in part on the at least one other token and the connector code to generate an access token for the second mobile application.

17. The computing device of claim 16 wherein the program logic further comprises executable logic for sending, to the second mobile application, the access token for the second mobile application, wherein the access token for the second mobile application is stored in the shared security mechanism by the second mobile application.

18. The computing device of claim 16 wherein the request for an access token for the first mobile application comprises an authorization code, and the request for access token for the first mobile application comprises a request to exchange the authorization code for the first mobile application's access token, the connector code and the at least one other token.

* * * * *